United States Patent
Seger

(10) Patent No.: US 7,143,318 B2
(45) Date of Patent: Nov. 28, 2006

(54) IDENTIFYING SYSTEMATIC ERRORS IN A DATA RECORDING SYSTEM

(75) Inventor: Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/646,648

(22) Filed: Aug. 21, 2003

(65) Prior Publication Data
US 2005/0044470 A1   Feb. 24, 2005

(51) Int. Cl.
G11B 20/18   (2006.01)
(52) U.S. Cl. ............................. 714/47; 360/53; 369/53; 714/704
(58) Field of Classification Search ............... 714/47, 714/704; 360/53; 369/53
See application file for complete search history.

(56) References Cited

U.S. PATENT DOCUMENTS

| | | | | |
|---|---|---|---|---|
| 4,951,282 A | * | 8/1990 | Mester | 714/704 |
| 4,958,337 A | * | 9/1990 | Yamanaka et al. | 369/53.36 |
| 5,253,126 A | * | 10/1993 | Richmond | 360/53 |
| 5,633,767 A | * | 5/1997 | Boutaghou et al. | 360/53 |
| 5,737,519 A | * | 4/1998 | Abdelnour et al. | 714/39 |
| 5,828,583 A | * | 10/1998 | Bush et al. | 702/185 |
| 5,914,967 A | * | 6/1999 | Yomtoubian | 714/718 |
| 5,923,876 A | * | 7/1999 | Teague | 719/321 |
| 6,317,850 B1 | * | 11/2001 | Rothberg | 714/704 |
| 6,411,083 B1 | * | 6/2002 | Inaba | 324/210 |
| 6,574,754 B1 | * | 6/2003 | Smith | 714/47 |
| 6,624,958 B1 | * | 9/2003 | Alva | 360/53 |
| 6,898,033 B1 | * | 5/2005 | Weinstein et al. | 360/31 |
| 6,982,842 B1 | * | 1/2006 | Jing et al. | 360/31 |

* cited by examiner

Primary Examiner—Stephen M. Baker
(74) Attorney, Agent, or Firm—Dan Shifrin

(57) ABSTRACT

The present invention differentiates between systematic and non-systematic conditions by observing a figure of merit over a series of many observation events. In a data storage recording environment, the particular figure of merit used is the number of data segments that must be re-written (due to errors) to a recording medium in order to assure that an entire data set is correctly written. A larger number of re-written segments is indicative of a significant error condition. After each data set is completely and correctly written, the number of re-written segments for the data set is reported as an "event." A running history of the classified events (or the events themselves) is maintained. Then, at a predetermined time, the history is analyzed and a decision made as to whether any observed events meets predetermined criteria for a systematic condition.

57 Claims, 9 Drawing Sheets

IDENTIFYING SYSTEMATIC ERRORS IN A DATA RECORDING SYSTEM

TECHNICAL FIELD

The present invention relates to the identification of systematic errors in a system, particularly in a data recording system such as a magnetic tape device or an optical recording device.

COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND ART

As is known, systems of all types are prone to errors due to any of various conditions. Some conditions may be transient (temporary and possibly self-correcting). Other conditions may be systematic (neither temporary nor self-correcting). Non-systematic conditions may cause problems for the system, such problems are generally temporary and may not require corrective action. By contrast, systematic conditions may also cause problems for the system but due to their non-temporary nature, will generally require some corrective action to be taken, either by a human system operator or by an error correction procedure within the system itself. It is important to be able to distinguish between systematic and non-systematic errors to ensure that proper corrective action is taken only when necessary, thereby reducing inefficiency due to unnecessary (and possibly time consuming and/or costly) actions.

An example of a system is a data recording device, such as a magnetic tape drive (an optical disc recorder is an example of another system to which the present invention is applicable). Customer data is written to magnetic tape media in logical units, herein referred to as "data sets". Each data set comprises a fixed number of sub-units, herein referred to as "data segments". During a write operation, the data segments of a data set are recorded onto the tape media. Following this recording, the data segments are read back by the tape drive to identify any segments which contain errors. If an erroneously written segment is identified, it is re-written, typically to a different location on the tape media. When all erroneous segments have been re-written, they are read back to identify further errors. The read-back/re-write process continues until the tape medium contains at least one error free image of each segment in the data set. As will be understood, the total number of data segments actually recorded onto the tape medium will be larger than the number of data segments in the data set if any erroneously written segments have been identified.

If each re-written segment is recorded to a different location on the tape medium from the corresponding originally recorded segment, the total amount of useful data which can be recorded onto the tape medium is reduced. If the number of segments which are re-written is large, the loss of capacity on the tape medium becomes significant. Moreover, the write data rate suffers because of the extra time required to re-write the erroneously written segments and the read data rate similarly suffers because of the extra time required to read all written and re-written segments in order to obtain a complete image of the data set.

There are numerous possible conditions which may cause a data segment to be erroneous and have to be re-written. Such conditions include:

1) random electronic noise;
2) a media defect, such as poor magnetic coating, substrate irregularities or physical damage (creases or distortion); and
3) other causes, such as mismatch among the settings of the read and write channel electronics, the write head and the tape media. Such a mismatch may originate in the manufacturer's system set up, differences in components, normal aging and/or wear of components.

The first condition is always transient; the second cause is typically transient; and, the third is systematic and not transient.

When a data segment is erroneous due to a transient condition, little if anything may be done to correct the problem because, by definition, it has passed. However, a systematic condition may be correctable if it can be detected and identified as systematic. For example, adjustments may be made to the electronics to offset a mismatch among components or to compensate for aging or wear. It will be appreciated that performing such tuning when the condition is only transient will result in a de-tuned, suboptimal system.

Existing methods fail to adequately and consistently distinguish between systematic and non-systematic conditions. One such method averages input values without distinguishing between many small events, which are indicative of systematic conditions, and a few large events, which are indicative of localized or large random (transient) conditions. Averaging is unable to consistently analyze statistics resulting from the input values. A second method relies on a decreasing moving average (using an IIR filter). However, this method is also unable to consistently distinguish between long term (systematic) conditions and sporadic, localized (transient) events.

Consequently, a need remains to be able to consistently identify systematic errors in a system, thereby allowing remedial action to be taken only when appropriate.

SUMMARY OF THE INVENTION

The present invention provides a method and apparatus for identifying systematic conditions during a data storage write operation in a data recording device. Multiple data observations of recorded data sets are made and stored in a buffer. When a data set has been completely written to the recording medium, the number of re-written segments in the data set (or the total number of data segments written for the data set, both originally and during the re-write phase) is stored in a buffer cell. When the buffer is full, each stored cell value in the entire buffer is compared with a first threshold and the number of values which exceed the first threshold is determined. Additionally, the stored values in a smaller sub-set of the entire buffer (preferably representing the most recent buffer entries) are compared with a second threshold and the number of such values which exceed the second threshold is determined. If the number of values which exceed the first threshold exceeds a third threshold and the number of values which exceed the second threshold exceeds a fourth threshold, a systematic condition is indicated.

DETAILED DESCRIPTION OF THE PREFERRED EMBODIMENT

Figure 1:
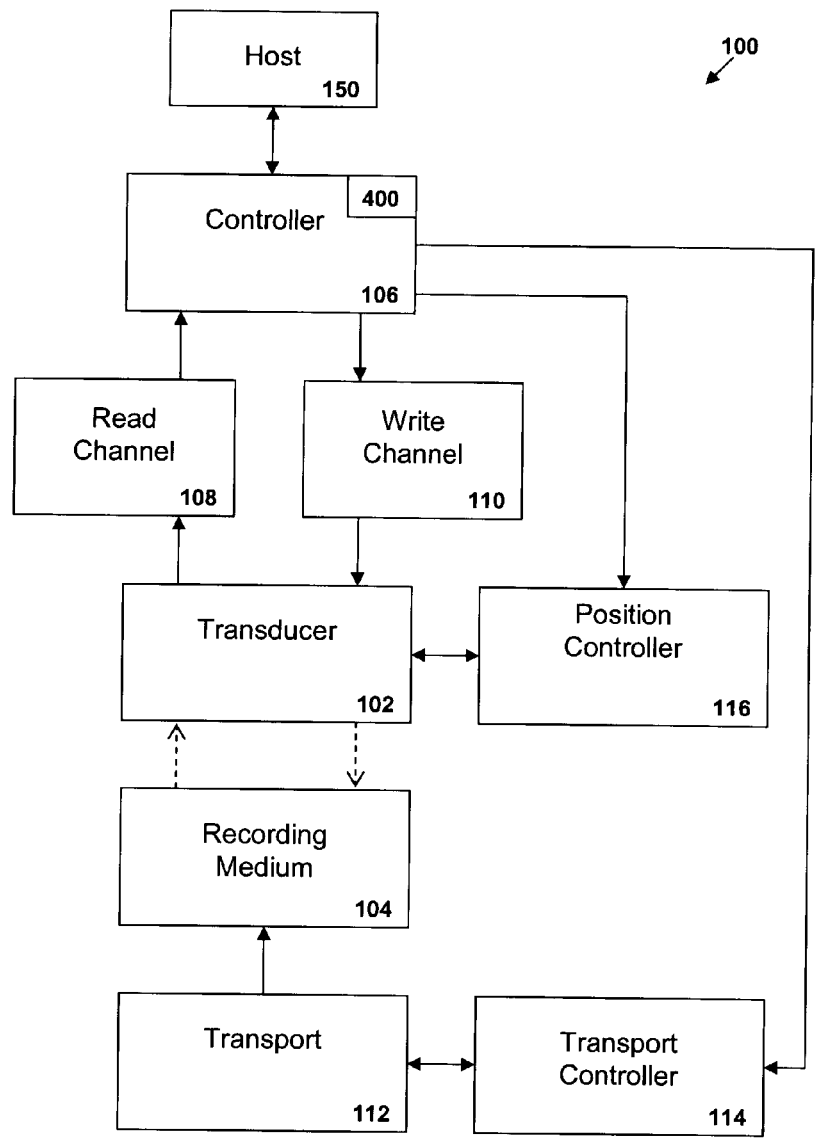
FIG. 1 is a block diagram of a data storage recording device in which the present invention may be incorporated.

The present invention differentiates between systematic and non-systematic (transient) conditions by observing a figure of merit over a series of many observation events. Each event is classified and, based on the respective classifications, a decision may be made as to the nature of a condition. In a data storage recording environment, the particular the figure of merit used is the number of data segments that must be re-written (due to errors) to a recording medium in order to assure that an entire data set is correctly written. A larger number of re-written segments is indicative of a significant error condition. The present invention is able to determine whether such an error condition is a systematic one (to which remedial action may be applied) or a non-systematic one (to which the application of remedial action is likely to be a wasted effort).

After each data set is completely and correctly written, the number of re-written segments for the data set is reported as an "event." An algorithm classifies each observed event into one of several event types. In one classification, three event types might be 'good', 'bad' and 'very bad'. (It will be appreciated, however that classifications and classification labels are arbitrary and that other classifications and labels may be used.) A running history of the classified events (or the events themselves) is maintained. Then, at a predetermined time, the history is analyzed and the decision made as to whether any of the observed events meets the predetermined criteria for a systematic condition. Such criteria include several factors:

1) the number of observed events, representing a physical distance or a period of time;
2) the severity of the individual observed events;
3) the proportion of observed events which exceed one or more thresholds over the entire observation period; and
4) the proportion of observed events which exceed one or more thresholds over a shorter, preferably recent, observation period.

Two (or more) observation periods enable an accurate and consistent differentiation between systematic and non-systematic conditions because a systematic condition will exist over the entire observation period, including over a shorter, more recent period. By contrast, a non-systematic condition may be identified when the entire observation period is analyzed but will not appear when only the shorter, more recent period is analyzed: due to its transient nature, it will have disappeared.

The present invention includes a buffer into which multiple data observations are stored. When a data set has been completely written to the recording medium, the number of re-written segments in the data set (or the total number of data segments written for the data set, both originally and during the re-write phase) is stored in a buffer cell. When the buffer is full, each stored cell value in the entire buffer is compared with a first threshold and the number of values which exceed the first threshold is determined. Additionally, the stored values in a smaller sub-set of the entire buffer (preferably representing the most recent buffer entries) are compared with a second threshold and the number of such values which exceed the second threshold is determined. If the number of values which exceed the first threshold exceeds a third threshold and the number of values which exceed the second threshold exceeds a fourth threshold, a systematic condition is indicated.

FIG. 1 is a block diagram of a data storage recording device 100. While the present invention will be described with particular application to a data storage recording system, it is also applicable to other types of systems in which transient and systematic errors occur. The recording device 100 includes a transducer (also known as a read/write head) 102 in close proximity to a recording medium 104 for recording data onto and reading data from the medium. The recording device 100 also includes a controller 106, a read channel 108 and a write channel 110. Data to be recorded is received by the controller 106 from a host 150 and sent through the write channel 110 to the transducer 102. Data to be read from the medium 104 is detected by the transducer 102 and sent through the read channel 108 to the controller 106 for transmission to the host 150.

Figure 2:
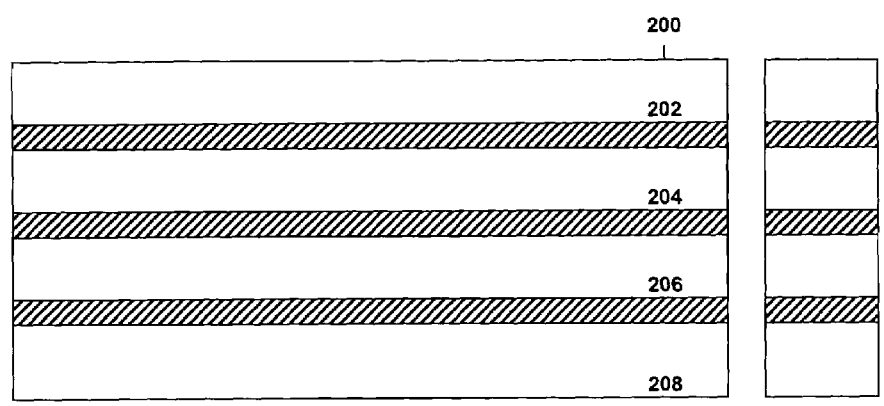
FIG. 2 illustrates a section of an exemplary tape medium.

Movement of the recording medium 102 is carried out by a media transport 112. If the medium 104 is magnetic recording tape, the transport 112 comprises a set of tape transport motors to move the tape in either of two direction across the transducer 102. FIG. 2 illustrates a section of an exemplary tape medium 200 having four tracks 202, 204 206 and 208 (the tape 200 is shown with four tracks for illustrative purposes only; tapes may actually have other numbers of tracks). If the transducer 102 of the recording device 100 is able to read/write a single track at one time (again for illustrative purposes only; high density transducers may have the ability to read/write many tracks at one time), the tape 200 will travel in a first direction (left to right, for example) while the first track 202 is written to or read from. Then, the transducer shifts and the tape direction reverses and the second track 204 is written to or read from. The process is continued until the read or write operation has been completed. The track (or tracks) which are accessed at one time in one direction is called a "wrap"; the tape changes direction each time a wrap is completed.

Figure 3:
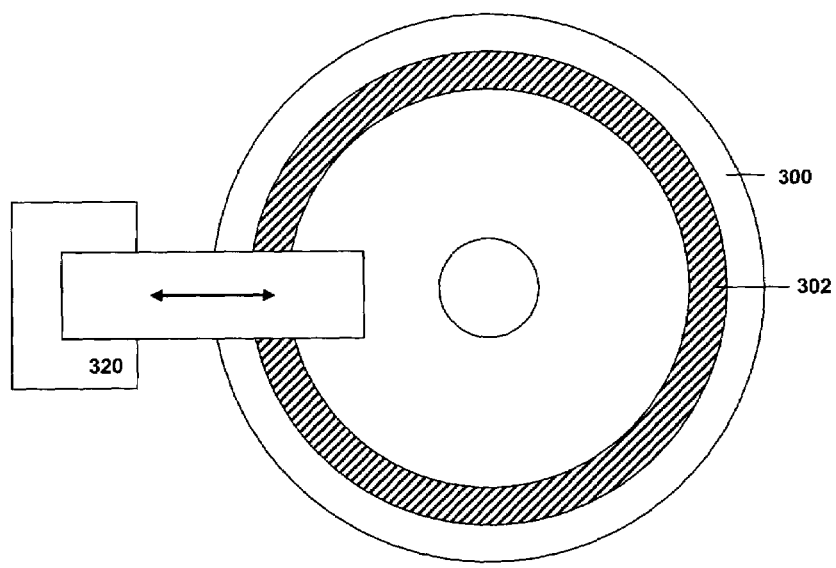
FIG. 3 illustrates an optical recording disc and an optical transducer.

If the medium 104 is an optical disc, the transport 112 comprises a spindle motor to rotate the disc over or under the transducer 102. The transport 112 is controlled by a transport controller 114 under the overall control of the controller 106. FIG. 3 illustrates an optical recording disc 300 and an optical transducer 320. Like the tape medium 200, the optical disc 300 includes a series of tracks (concentric or spiral, depending on the type of recording system) 302. The transducer 320 moves radially when seeking to or following a track and moves perpendicularly relative to the disc 300 when focusing.

Referring back to FIG. 1, the recording device 100 may also include a transducer position controller 116 to properly position the transducer 102 relative to the recording medium 104 for seeking and tracking operations (and, in the case of an optical recording device, for focusing operations as well).

Figure 4:
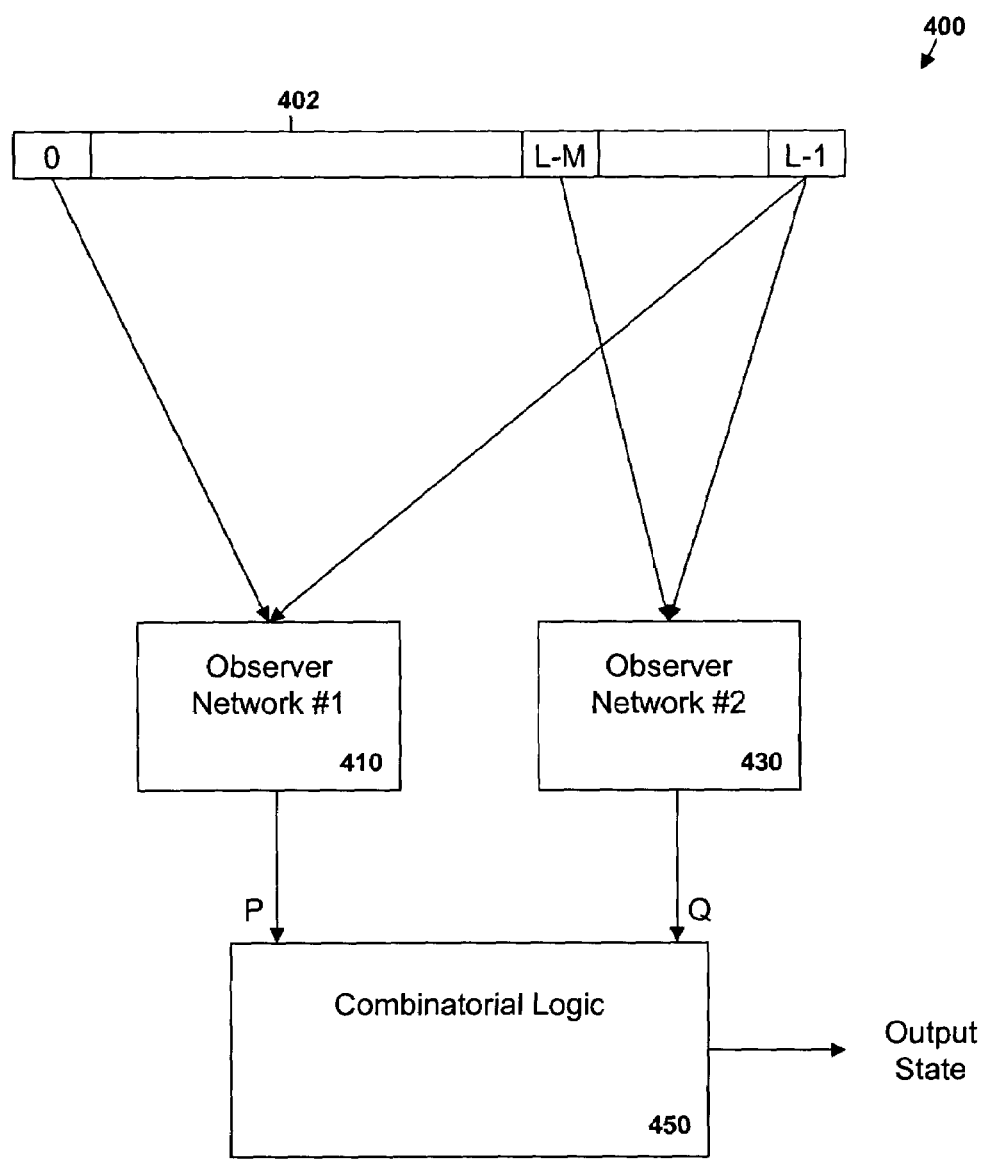
FIG. 4 is a block diagram of one embodiment of control logic of the present invention in which two networks are employed.

FIG. 4 is a block diagram of one embodiment of the control logic 400 of the present invention. The control logic 400 may be part of the recording device controller 100 or may be separate and connected thereto. The control logic 400 includes a buffer 402 comprising a series of L storage cells. Included in the L storage cells is a subset of M sequential cells. As will be described in more detail below, preferably the M cells are the cells which are filled last during a write operation. The control logic 400 further includes a first observer network 410 coupled to the buffer 402 to examine all L storage cells and a second observer network 430 coupled to the buffer 402 to examine only the M storage cells. Combinatorial logic module 450 is coupled to receive the outputs from the first and second networks 410 and 430. The output state of the Combinatorial logic module 450 represents the condition of the data recording device 100.

Figure 5:
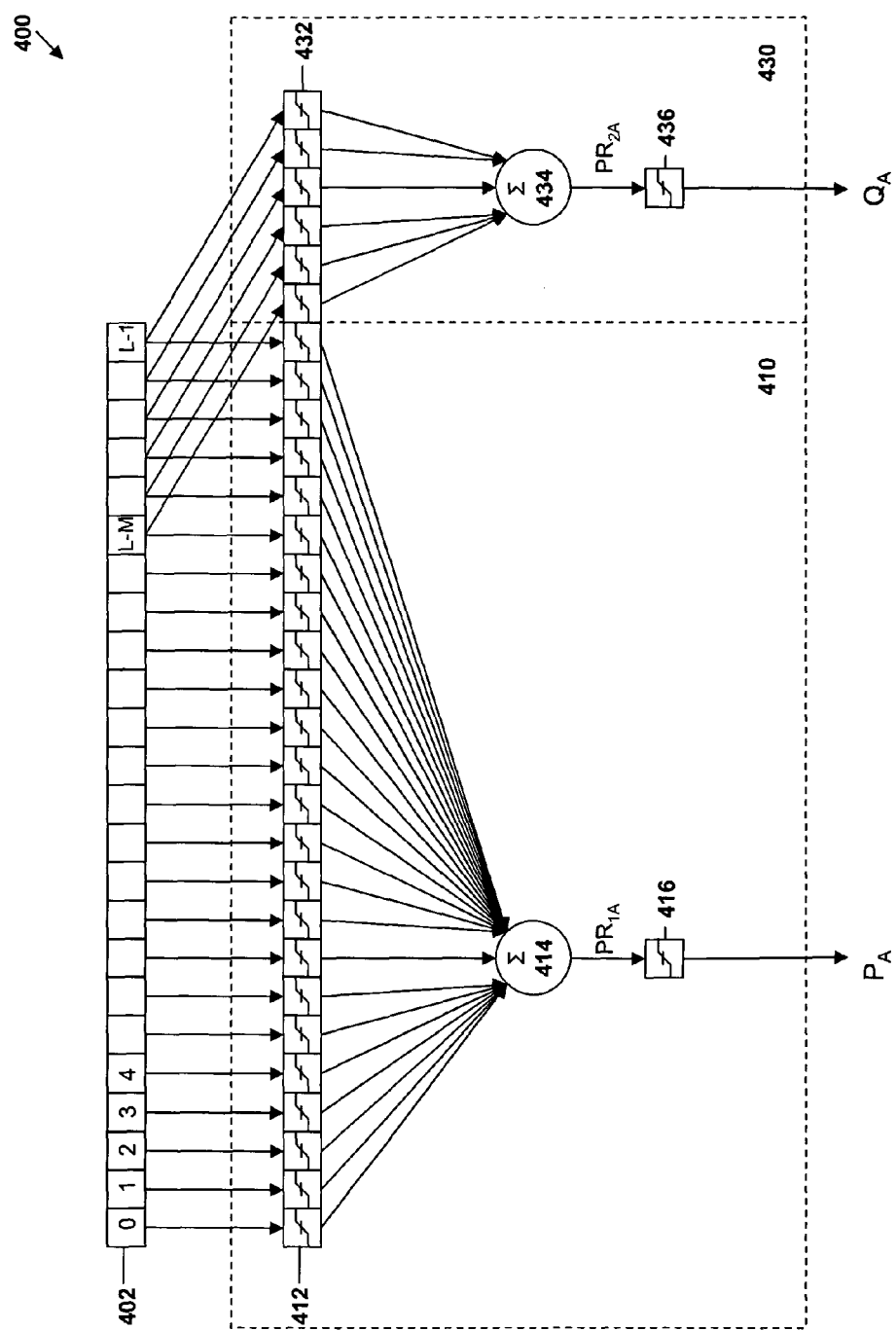
FIG. 5 is a logic diagram of the control logic of FIG. 4.

FIG. 5 is a logic diagram of the control logic 400 of FIG. 4. The first network 410 includes a first array of comparators 412, coupled to receive the contents of the L buffer cells, a summer or counter 414, coupled to the outputs of the first comparators 412, and a comparator 416, coupled to the output of the counter 414. The second network 430 includes a second array of comparators 432, coupled to receive the contents of the M buffer cells, a summer or counter 434, coupled to the outputs of the second comparators 432, and a comparator 436, coupled to the output of the counter 434. It will be appreciated that the two comparator arrays 412 and 432 reading the buffer cells simultaneously may alternatively each be a single comparator reading the buffer cells consecutively. Other functional equivalents may also be employed. It will also be appreciated that the functions of the block diagrams illustrated herein may also be implemented in software or firmware without hardware.

Figure 6A:
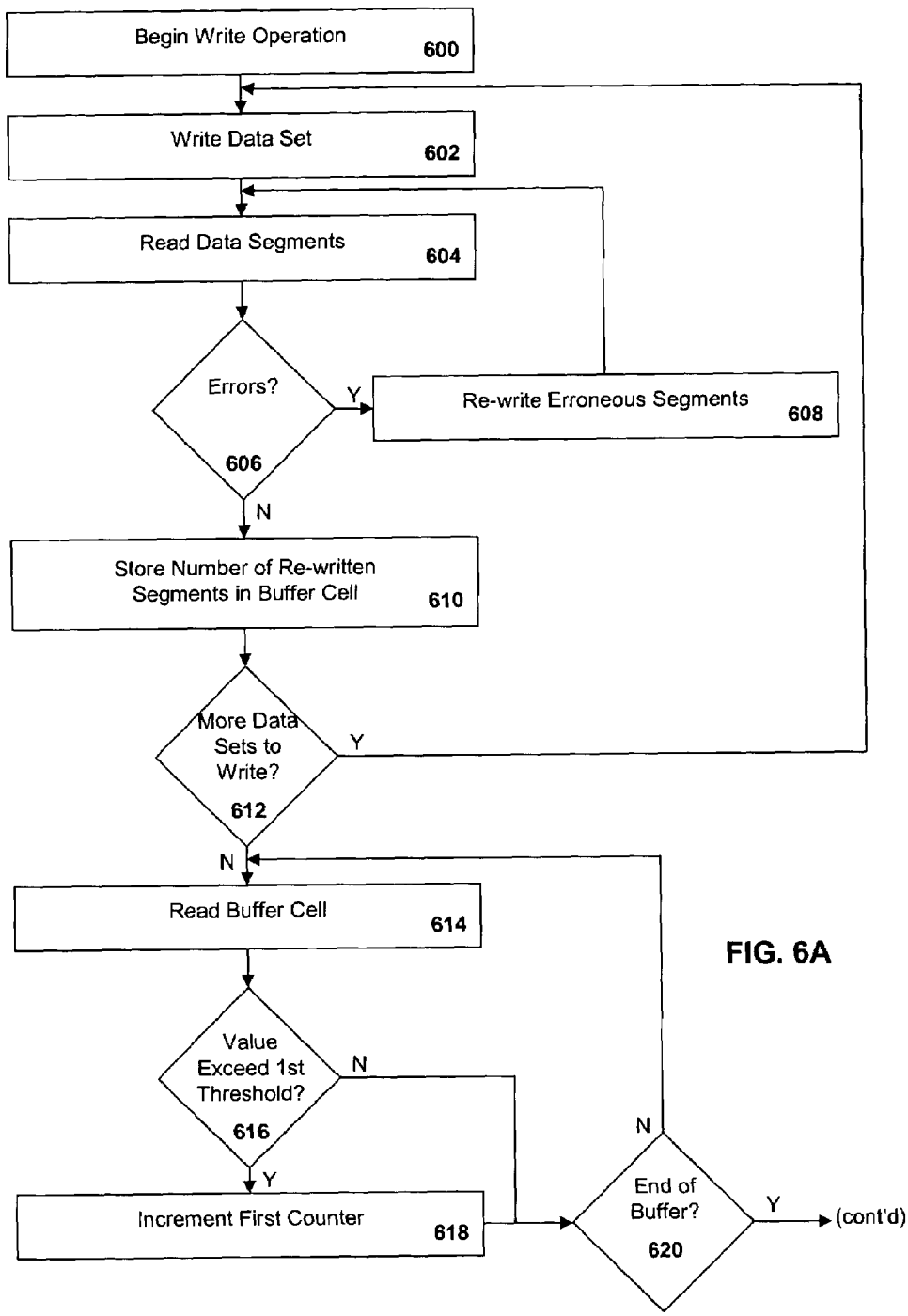
FIG. 6A is a flowchart of a method of the present invention.
Figure 6B:
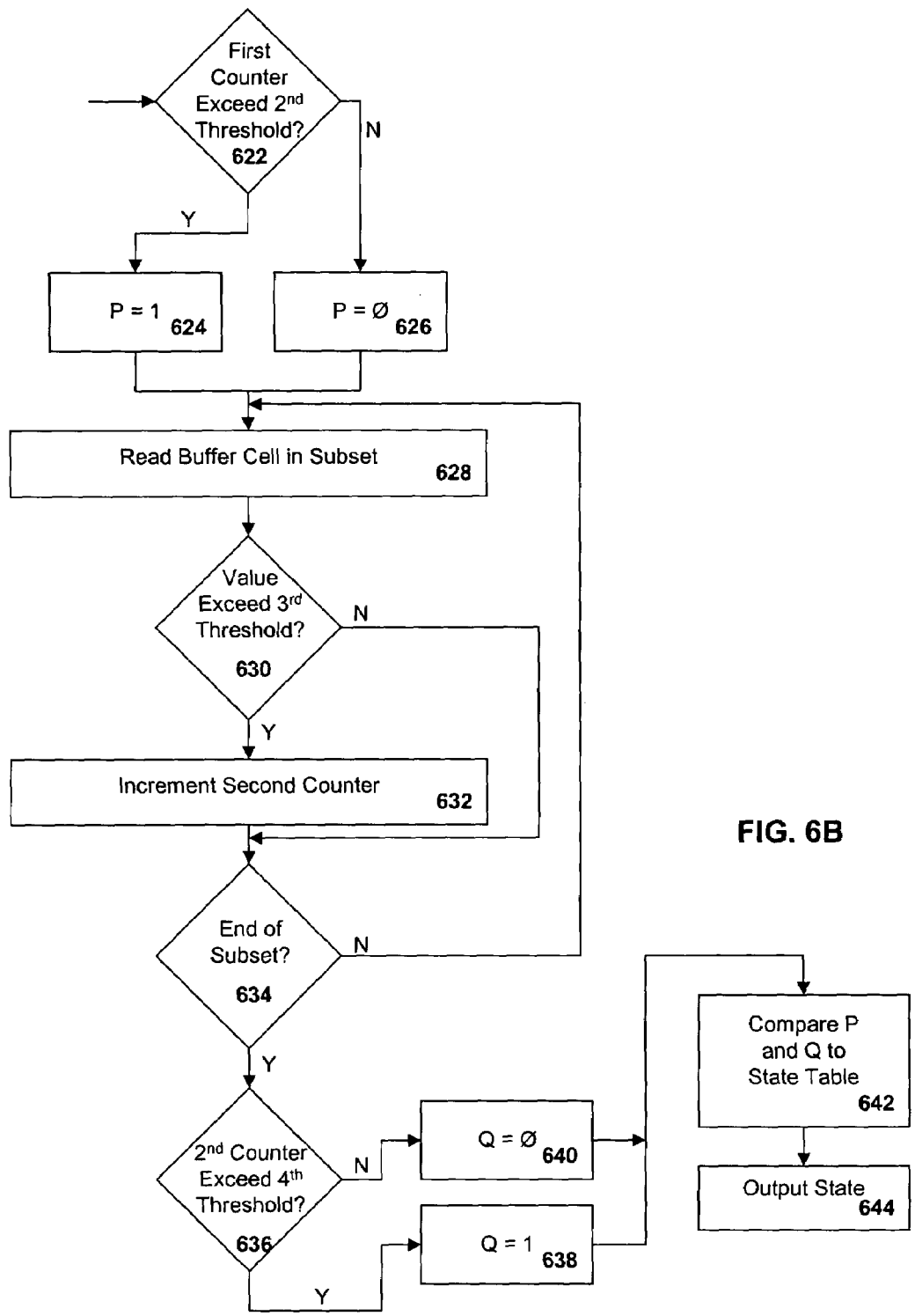
FIG. 6B is the continuation of the flowchart of FIG. 6A of a method of the present invention.

The operation of the control logic 400 will now be described with reference to both FIG. 5 and the flowchart of FIG. 6A and FIG. 6B. Threshold levels $TH_{HB-1A}$ and $TH_{HB-2A}$ are established for the first and second arrays of comparators 412 and 432, respectively. These two threshold levels may or may not be the same. Threshold levels $TH_{PR-1A}$ and $TH_{PR-2A}$ are also established for the other comparators 416 and 436.

When a write operation begins (step 600), a data set is written to the recording medium (step 602). The data segments are read back (step 604) and each is checked for errors. If any errors are detected (step 606), the erroneous segments are re-written (step 608). The data segments are re-read (step 604) and again checked for errors (step 606).

The process is repeated until no further errors are detected; the number of re-written segments is stored in the first cell of the buffer 402 (step 610). Alternatively, the total number of segments written, including those re-written, may instead be stored in the buffer cell and the excess later computed. It is then determined whether more data sets remain to be written (step 612). If so, the next data set is written (step 602) and the foregoing process continues until a complete and accurate image of each of the data sets has been written to the recording medium or until the buffer 402 if full.

The value stored in the first cell of the buffer 402 is then read by the first array of comparators 412 of the first network 410 (step 614); if the value does not exceed the first threshold value $TH_{HB-1A}$ (step 616), the value of the next cell is read (step 614). When a value is determined to exceed the first threshold value $TH_{HB-1A}$, the summer or counter 414 is incremented (step 618). The process continues until all of the buffer cell values have been read (step 620) by the corresponding comparator 412. The other comparator 416 in the first network 410 next reads the contents of the counter 414 and determines whether the total number of values which exceed the first threshold $TH_{HB-1A}$ exceeds the second threshold $TH_{PR-1A}$ (step 620). If so, the output $P_A$ of the comparator 416 is set to '1' (step 624); otherwise, the output $P_A$ is set to '0' (step 626).

The value stored in the first cell of the M buffer cells is then read by the second array of comparators 432 of the second network 430 (step 628). Preferably, the M values are the M most recently stored values; however, the M values may be read from any consecutive M cells. If the value does not exceed the third threshold value $TH_{HB-2A}$ (step 630), the value of the next cell is read (step 628). When a value is determined to exceed the third threshold value $TH_{HB-2A}$, the second summer or counter 434 is incremented (step 632). The process continues until all of the M buffer cell values have been read (step 634) by the corresponding comparator 432. The other comparator 436 in the second network 430 next reads the contents of the second counter 432 and determines whether the total number of values which exceed the third threshold $TH_{HB-2A}$ exceeds the fourth threshold $TH_{PR-2A}$ (step 636). If so, the output $Q_A$ of the comparator 436 is set to '1' (step 638); otherwise, the output $Q_A$ is set to '0' (step 640).

Finally, $P_A$ and $Q_A$ are compared with the following State Table I (step 642) to provide the output state (step 644).

| State Table I | | |
|---|---|---|
| $P_A$ | $Q_A$ | State |
| 0 | 0 | 0 |
| 0 | 1 | 1 |
| 1 | 0 | 2 |
| 1 | 1 | 3 |

Interpreting the State Table I, when the first state (State 0) is indicated, no significant errors occurred over either the long observation period (over the full L data sets) or the short observation period (over the M data sets). Thus, State 0 is a non-error state. When the second state (State 1) is indicated, a significant error was detected during the short observation period but not the long observation period. Thus, State 1 represents a late-occurring event or error. When the third state (State 2) is indicated, a significant error was detected during the long observation period but not the short observation period. Thus, State 2 represents a transient event. And, when the fourth state (State 3) is indicated, a significant error was detected during both the long observation period and the short observation period. Thus, State 3 represents a significant, long standing error; that is, a systematic error.

Figure 7:
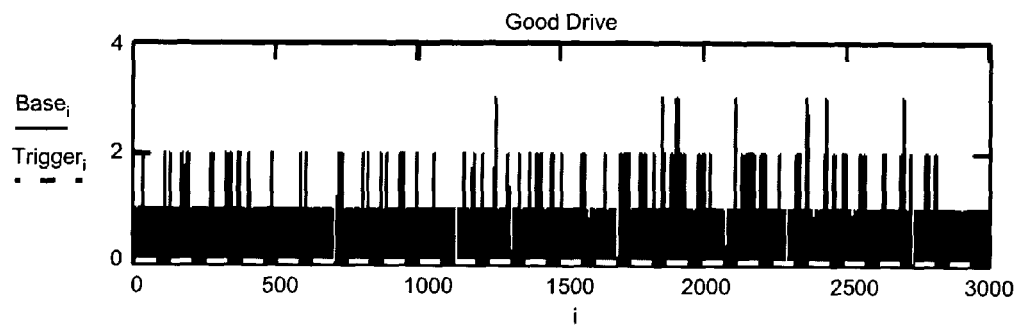
FIG. 7 is a data plot of a write operation during which the present invention has been implemented without indicating any error conditions.

FIGS. 7–11 are data plots of exemplary write operations illustrating results of the operation of the control logic 400 of the present invention. In each of the plots, the number of data sets 'i' written is along the horizontal axis and the number of data segments of each data set which were re-written is along the vertical axis. The long observation period L is equal to 1070 data sets. Such a number may equal the number of data sets which can be written in one tape wrap, may equal the number of data sets in a particular write operation, or may be a number selected empirically as being a reasonable number of data sets to observe (for example, a shorter period may treat too many transient errors as systematic and a longer period may treat too many systematic errors as transient). The short observation period M is equal to 107 data sets. In FIG. 7, the threshold values $TH_{HB-1A}$ and $TH_{HB-2A}$ have both been set to 2 and the threshold value $TH_{PR-1A}$ has been set to 696 and $TH_{PR-2A}$ has been set to 70. Although a few data sets have had more than 2 segments re-written, not enough have been re-written to pass through the comparators 416 and 436 and trigger an error indication. This is the non-error State 0.

Figure 8:
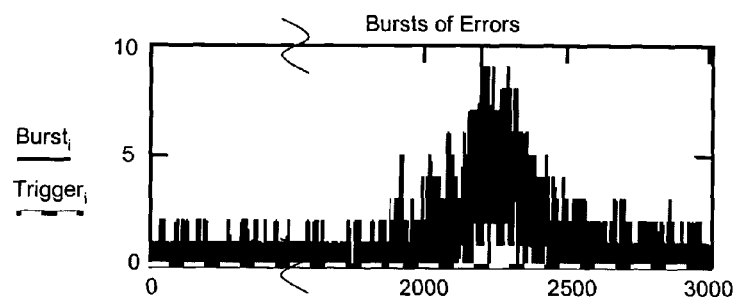
FIG. 8 is a plot of a write operation with a late-occurring error, detected only in the most recent M data sets.

FIG. 8 is a plot of a late-occurring error (State 1) in which the threshold values $TH_{HB-1A}$ and $TH_{HB-2A}$ have both been set to 3 and the threshold value $TH_{PR-1A}$ has been set to 696 and $TH_{PR-2A}$ has been set to 70. Because the "burst" error occurs late in the observation period, it is detected only in the M data sets.

Figure 9:
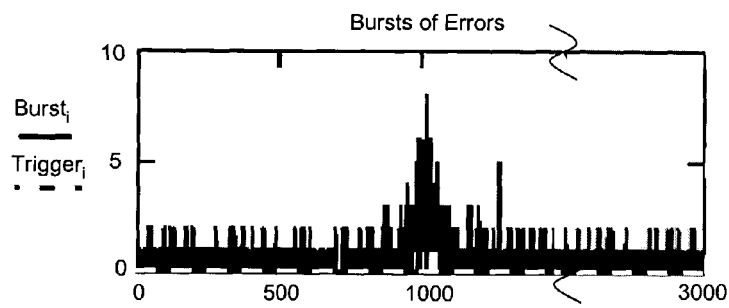
FIG. 9 is a plot of a write operation with a transient error detected in the L data sets but not in the M data sets.

FIG. 9 is a plot of a transient error (State 2) in which the threshold values $TH_{HB-1A}$ and $TH_{HB-2A}$ have again both been set to 3 and the threshold value $TH_{PR-1A}$ has been set to 696 and $TH_{PR-2A}$ has been set to 70. Because the error only occurs about half-way through the observation period and not near the end, it is detected in the L data sets but not in the M data sets. Whatever the cause of the error, it disappeared by the end of the observation period and is not a concern. Moreover, an attempt to correct the problem would be a wasted effort because the error is no longer present.

Figure 10:
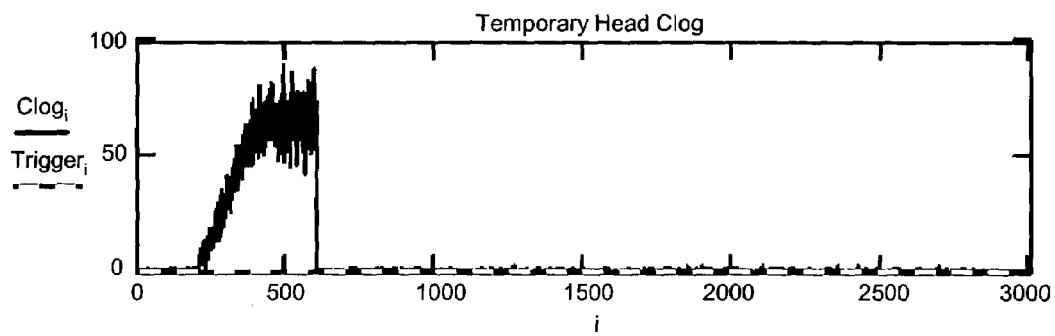
FIG. 10 is a plot of a write operation with another transient error not lasting long enough to be present in the most recent M data sets.

Similarly, FIG. 10 is a plot of another transient error (State 2). The transient illustrated in FIG. 10 may be the result of rapidly accumulating debris causing a temporary head clog early in the observation period. Although the number of re-written segments is high, the clog did not last long enough to be present in the last M data sets.

Figure 11:
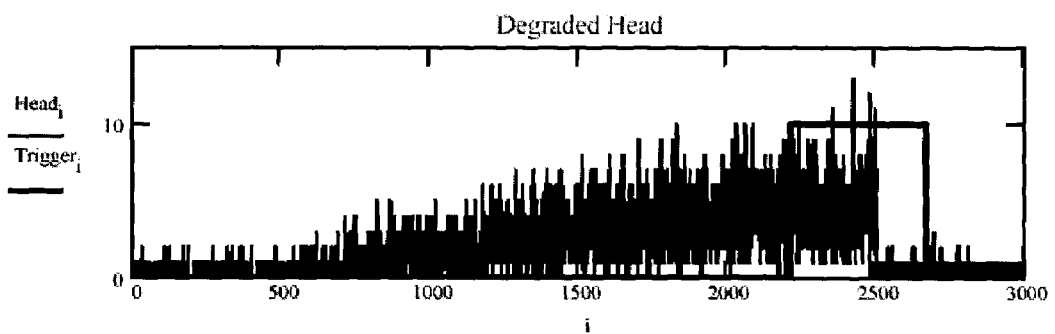
FIG. 11 is a plot of a write operation with a head clog which has built up over most of the observation period, including the most recent M data sets, and indicative of a systematic error condition.

By contrast, FIG. 11 is a plot of another head clog, but one which has more gradually built up over most of the observation period, including the last M data sets, and therefore is indicative of a systematic error condition (State 3) requiring remedial action such as a head cleaning.

Figure 12:
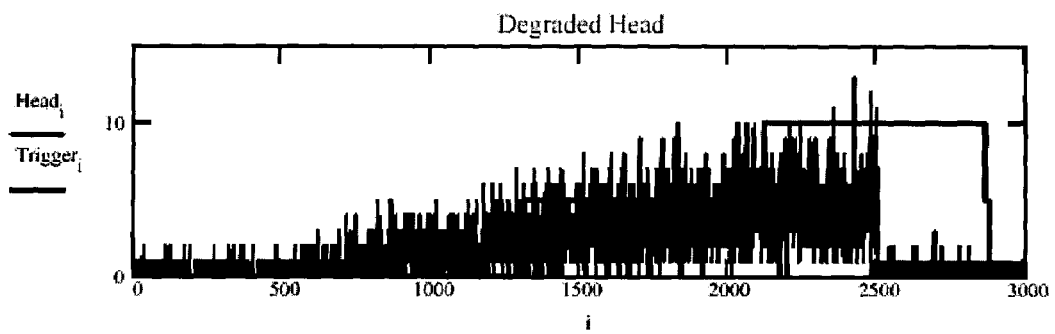
FIG. 12 is also a plot of a write operation with a systematic error condition present throughout a long portion of the observation period, including at the end.

FIG. 12 is also a plot of a significant error condition present throughout a long portion of the observation period, including at the end (State 3). The condition represented in FIG. 12 may be a gradual degradation of the transducer 102 which eventually became serious enough to trigger a systematic error indication and resulting remedial action (re-calibration for example). It should be noted that, if more than about 2700 data sets had been sampled, no such indication would be trigger because the error would not have been detected in the M most recent data sets.

When determining appropriate observation periods and threshold levels, selecting too high a set of levels may result in the misclassification of some systematic conditions as being transient, thereby permitting some systematic conditions to escape detection and preventing quick corrective action. And, selecting too low a set of levels may result in the misclassification of some transient conditions as being systematic, thereby triggering unnecessary (and possibly useless) correction action. The threshold value $TH_{HB-1A}$ should be set to a value which indicates when the capacity of the recording medium begins to fall below its required capacity and the threshold value $TH_{PR-1A}$ should be set to a value which indicates a substantially continuous condition (and confirmed by an appropriate setting of the threshold value $TH_{HB-2A}$). By empirical process, it has been found that a long observation period of 1070 data sets (with a buffer containing a corresponding L=1070 cells) and a short observation period of 107 data sets (and the M corresponding buffer cells being the most recently filled cells) is are appropriate periods for one tested magnetic tape system. Threshold values of $TH_{HB-1A}$ and $TH_{HB-2A}$ both equal to 3, $TH_{PR-1A}$ equal to a 321 (a value representing a approximately 30% of L) and $TH_{PR-2A}$ equal to 21 (a value representing approximately 20% of M) have been found to be appropriate for the tested tape system. It will be appreciated that any of these parameters may change for other tape systems as well as for other types of recording systems, such as optical disc systems. Moreover, these parameters may also depend upon the type of conditions and events to be detected.

Figure 13:
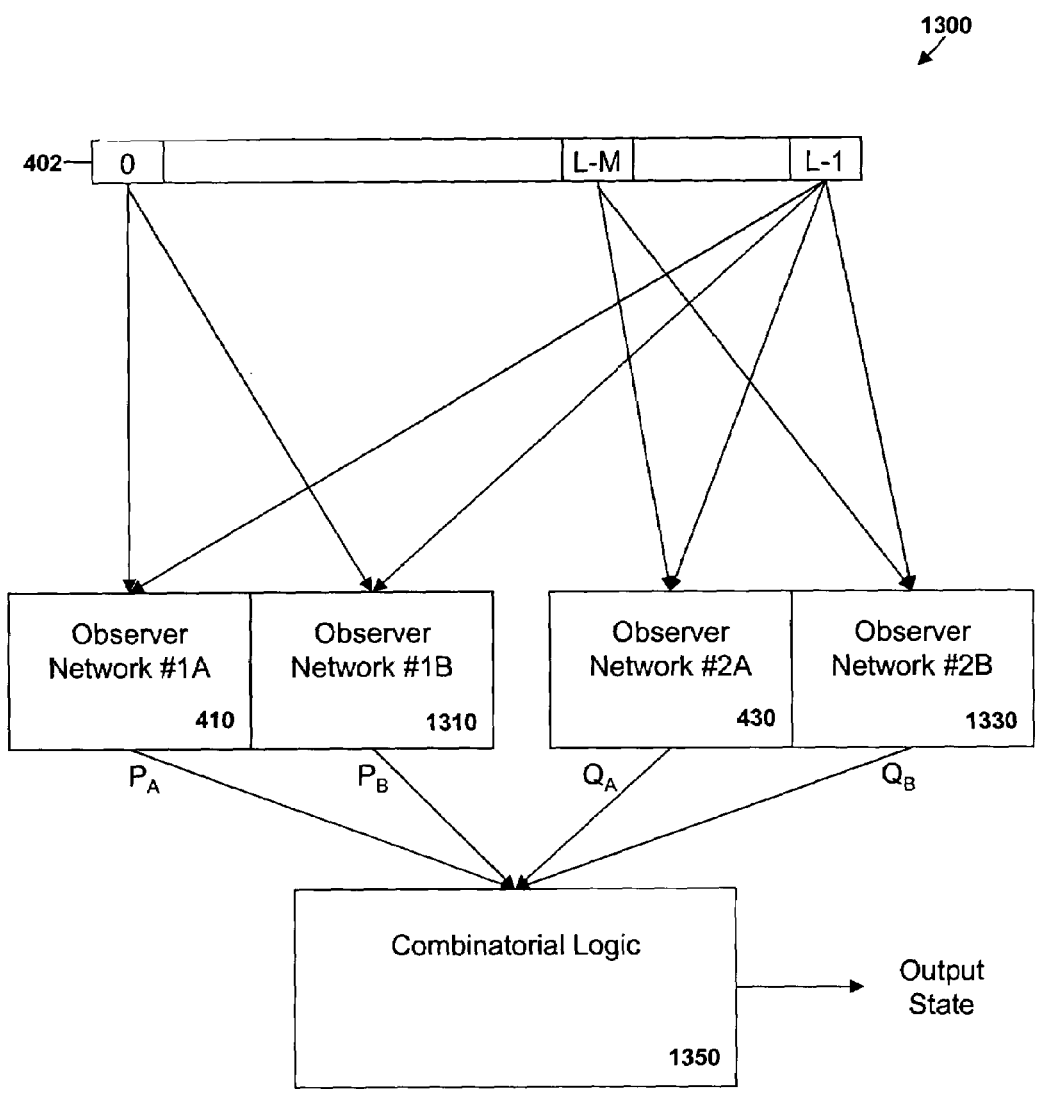
FIG. 13 is a block diagram of a second embodiment of control logic of the present invention in which four networks are employed.

Instead of four detectable states, further information may be obtained when an additional two (or more) observation networks are employed to supplement the first two networks 410 and 430, as illustrated by the control logic 1300 in FIG. 13. The first and second networks 410 and 430 may be the same as those illustrated in FIGS. 4 and 5. The third and fourth networks 1310 and 1330 are also the same but have been assigned different threshold values for $TH_{HB-1B}$, $TH_{HB-2B}$, $TH_{PR-1B}$ and $TH_{PR-2B}$. It may also be useful to not only observe the most recent M values but different portions of the buffer as well. The combinatorial logic processes the outputs $P_A$, $Q_A$, $P_B$ and $Q_B$ from the four networks 410, 430, 1310 and 1330 and generates an output according to the following State Table II:

| | | State Table II | | |
|---|---|---|---|---|
| $P_A$ | $Q_A$ | $P_B$ | $Q_B$ | State |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

It will be noted that States 0, 4, 8 an 12 correspond to States 0, 1, 2 and 3 of the first State Table I.

By appropriate setting of the threshold levels, it may be determined that a condition is systematic but correctable by, for example, recalibration or that the condition is systematic but correctable by, for example, a head cleaning (or not solvable at all).

The number of states may be reduced to a more convenient, but still valuable, number if $TH_{HB-1A}$ is less than $TH_{HB-1B}$, and if $TH_{PR-1A}$ is set less than or equal to $TH_{PR-1B}$ so that, whenever $P_B$ equals 1, $P_A$ will also equal 1. Similarly, if $TH_{HB-2A}$ is set less than $TH_{HB-2B}$ and if $TH_{PR-2A}$ is set less than or equal to $TH_{PR-2B}$, whenever $Q_B$ equals 1, $Q_A$ will also equal 1. Thus, the following State Table II results:

Reduced State Table III

| $P_A$ | $Q_A$ | $P_B$ | $Q_B$ | State |
|---|---|---|---|---|
| 0 | 0 | 0 | 0 | 0 |
| 0 | 1 | 0 | 0 | 4 |
| 0 | 1 | 0 | 1 | 5 |
| 1 | 0 | 0 | 0 | 8 |
| 1 | 0 | 1 | 0 | 10 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

State 0 indicates that all observation regions are substantially error free. State 4 indicates that, although the most recent region contains an error, the error was not long enough to indicate a significant condition. State 5 indicates that the most recent region included a head clog, it did not last long enough to indicate a significant condition. State 8 indicates that a significant condition existed earlier in the long observation period but is no longer present. State 10 indicates that a head clog may have been present but is no longer present. State 12 indicates that an error condition exists and requires remedial action. State 13 indicates that an error condition exists and requires remedial action. It also indicates that a head clog may exist in the recent region but has not persisted long enough to require significant remedial action. State 14 indicates that an error condition exists and requires remedial action. It also indicates that a head clog did exist but no longer exists. And, State 15 indicates that that a major systematic condition exists requiring significant remedial action.

The Appendix is a C-code listing of an exemplary software implementation of the present invention.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

APPENDIX

Values shown in the #define statements are for illustation only.

Function "InitializeBuffer" sets all History Buffer elements to zero upon initialization. This is required only if the output is sampled before the first L elements are entered.

```
#define    L    1070            // Number of elements in the History Buffer
#define    M    107             // Number of M elements in the History Buffer
#define    TH_HB_1A 6           // TH_HB for network 1A
#define    TH_HB_1B 20          // TH_HB for network 1B
#define    TH_HB_2A 7           // TH_HB for network 2A
#define    TH_HB_2B 25          // TH_HB for network 2B
#define    TH_PR_1A 300         // TH_PR for network 1A
#define    TH_PR_1B 300         // TH_PR for network 1B
#define    TH_PR_2A 30          // TH_PR for network 2A
#define    TH_PR_2B 30          // TH_PR for network 2B
int        History_Buffer[L];// The History Buffer of L elements
void       InitializeBuffer(void)
{
           // Set all elements to zero
           int i;
           for (i=0 ; i<L ; i++)
                   History_Buffer[i] = 0;
}
int ProcessNewHistoryBufferElement(int NewValue)
{
           // Illustrates placing one new observation into the History Buffer
           // then computing the resulting system state.
           // Input:    NewValue - number of rewritten sub-units for this Data Set
           // Output:   State - the resulting system state
           // For clarity, this illustration assumes that input elements are
           // placed in the last element of the History Buffer. Doing so requires
           // that the entire History Buffer be shifted with each new entry.
           // An efficient implementation would use pointers to maintain input
           // and output indices eliminating the need for shifting the buffer.
           // The origin is zero (counts start at zero). Therefore the first
           // location in the History Buffer is History_Buffer[0] and the last
           // location is History_Buffer[L-1].
           int        counter;
           int        i;
```

```
            int     Pa, Pb, Qa, Qb;
            int     State;
    // Rotate History Buffer: discarding oldest entry, making room for new
    for (i=1 ; i<L ; i++)
            History_Buffer[i-1] = History_Buffer[i];
    // Place new element into History Buffer
    History_Buffer[L-1] = NewValue;
    // EVALUATE OBSERVER NETWORK #1A over L elements
    // Count number of History Buffer items that equal or exceed TH_HB_1A
    counter = 0;
    for (i=0 ; i<L ; i++)
            if ( TH_HB_1A <= History_Buffer[i])
                    counter = counter + 1;
    // Set Pa = 1 if the count equals or exceeds TH_PR_1A
    if ( TH_PR_1A <= counter)
            Pa = 1;
    else
            Pa = 0;
    // EVALUATE OBSERVER NETWORK #1B over L elements
    // Count number of History Buffer items that equal or exceed TH_HB_1B
    counter = 0;
    for (i=0 ; i<L ; i++)
            if ( TH_HB_1B <= History_Buffer[i])
                    counter = counter + 1;
    // Set Pb = 1 if the count equals or exceeds TH_PR_1B
    if ( TH_PR_1B <= counter)
            Pb = 1;
    else
            Pb = 0;
    // EVALUATE OBSERVER NETWORK #2A over M elements
    // Count number of History Buffer items that equal or exceed TH_HB_2A
    counter = 0;
    for (i=L-M ; i<L ; i++)
            if ( TH_HB_2A <= History_Buffer[i])
                    counter = counter + 1;
    // Set Qa = 1 if the count equals or exceeds TH_PR_2A
    if ( TH_PR_2A <= counter)
            Qa = 1;
    else
            Qa = 0;
    // EVALUATE OBSERVER NETWORK #2B over M elements
    // Count number of History Buffer items that equal or exceed TH_HB_2B
    counter = 0;
    for (i=L-M ; i<L ; i++)
            if ( TH_HB_2B <= History_Buffer[i])
                    counter = counter + 1;
    // Set Qb true if the count equals or exceeds TH_PR_2B
    if ( TH_PR_2B <= counter)
            Qb = 1;
    else
            Qb = 0;
    // Combine the Pa, Pb, Qa, and Qb in a convenient manner for output
    // For illustration, convert them to value 0 through 15
    State = Qb + 2*Pb + 4*Qa + 8*Pa;
    return State;
}
```

What is claimed is:

1. A method for identifying systematic errors in a data recording device, comprising:

writing a plurality of data sets to a recording medium, each data set comprising a plurality of data segments;

identifying erroneously written data segments of each data set;

for each data set, storing in a buffer cell a value representative of the number of erroneously written data segments for the data set;

determining the number $PR_{1A}$ of a first plurality L of buffer cells which contain stored values in excess of a first predetermined threshold value $TH_{HB-1A}$;

determining the number $PR_{2A}$ of a second plurality M of buffer cells which contain stored values in excess of a second predetermined threshold value $TH_{HB-2A}$, where M<L; and generating an output signal indicating at least one of: whether the number $PR_{1A}$ exceeds a third predetermined threshold value $TH_{PR-1A}$ and whether the number $PR_{2A}$ exceeds a fourth predetermined threshold value $TH_{PR-2A}$.

2. The method of claim 1, further comprising:

reading back each data set;

re-writing the erroneously written data segments of the data set to the recording medium;

repeating the writing, reading, re-writing and storing steps until the plurality of L data sets have been written to the recording medium and a like plurality of values have been stored in successive buffer cells, including the plurality of M successively stored values;

wherein the value representative of the number of erroneously written data segments is representative of the number of re-written data segments for the data set;

wherein the output signal further indicates
- a first state if $PR_{1A}$ is less than the third threshold value $TH_{PR-1A}$ and $PR_{2A}$ is less than the fourth predetermined threshold value $TH_{PR-2A}$, the first state indicative of a non-error condition;
- a second state if $PR_{1A}$ is less than the third threshold value $TH_{PR-1A}$ and $PR_{2A}$ is greater than the fourth predetermined threshold value $TH_{PR-2A}$, the second state indicative of a late-occurring event;
- a third state if $PR_{1A}$ is greater than the third threshold value $TH_{PR-1A}$ and $PR_{2A}$ is less than the fourth predetermined threshold value $TH_{PR-2A}$, the third state indicative of a transient event; and
- a fourth state if $PR_{1A}$ is greater than the third threshold value $TH_{PR-1A}$ and $PR_{2A}$ is greater than the fourth predetermined threshold value $TH_{PR-2A}$, the fourth state indicative of a systematic condition.

3. The method of claim 1, further comprising:
setting a variable $P_A$ equal to 1 if $PR_{1A}$ exceeds $TH_{PR-1A}$ and otherwise setting $P_A$ equal to 0; and
setting a variable $Q_A$ equal to 1 if $PR_{2A}$ exceeds $TH_{PR-2A}$ and otherwise setting $Q_A$ equal to 0;
whereby:
- the output signal is in the first state if both $P_A$ and $Q_A$ equal 0;
- the output signal is in the second state if $P_A$ equals 0 and $Q_A$ equals 1;
- the output signal is in the third state if $P_A$ equals 1 and $Q_A$ equals 0; and
- the output signal is in the fourth state if both $P_A$ and $Q_A$ equal 1.

4. The method of claim 3, further comprising:
determining the number $PR_{1B}$ of the L buffer cells which contain stored values in excess of a third predetermined threshold value $TH_{HB-1B}$;
determining the number $PR_{2B}$ of the M buffer cells which contain stored values in excess of a fourth predetermined threshold value $TH_{HB-2B}$;
generating the output signal having fifth through twentieth states, each state indicative of a characteristic of the data recording device, the fifth, ninth, thirteenth and seventeenth states corresponding to the first, second, third and fourth states, respectively.

5. The method of claim 4, further comprising:
setting a variable $P_B$ equal to 1 if $PR_{1B}$ exceeds $TH_{PR-1B}$ and otherwise setting $P_B$ equal to 0; and
setting a variable $Q_B$ equal to 1 if $PR_{2B}$ exceeds $TH_{PR-2B}$ and otherwise setting $Q_B$ equal to 0.

6. The method of claim 5, wherein the output signal is in the fifth through twentieth states according to a state table:

State Table

| $P_A$ | $Q_A$ | $P_B$ | $Q_B$ | State |
|---|---|---|---|---|
| 0 | 0 | 0 | 0 | 5 |
| 0 | 0 | 0 | 1 | 6 |
| 0 | 0 | 1 | 0 | 7 |
| 0 | 0 | 1 | 1 | 8 |
| 0 | 1 | 0 | 0 | 9 |
| 0 | 1 | 0 | 1 | 10 |
| 0 | 1 | 1 | 0 | 11 |
| 0 | 1 | 1 | 1 | 12 |
| 1 | 0 | 0 | 0 | 13 |
| 1 | 0 | 0 | 1 | 14 |
| 1 | 0 | 1 | 0 | 15 |
| 1 | 0 | 1 | 1 | 16 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

7. The method of claim 5, further comprising:
setting $TH_{HB-1A} < TH_{HB-1B}$ and setting $TH_{PR-1A} \leq TH_{PR-1B}$, whereby, when $P_B=1$, $P_A=1$;
setting $TH_{HB-2A} < TH_{HB-2B}$ and setting $TH_{PR-2A} \leq TH_{PR-2B}$, whereby, when $Q_B=1$, $Q_A=1$; and
generating the output signal according to a reduced state table:

Reduced State Table

| $P_A$ | $Q_A$ | $P_B$ | $Q_B$ | State |
|---|---|---|---|---|
| 0 | 0 | 0 | 0 | 5 |
| 0 | 1 | 0 | 0 | 9 |
| 0 | 1 | 0 | 1 | 10 |
| 1 | 0 | 0 | 0 | 13 |
| 1 | 0 | 1 | 0 | 15 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

8. The method of claim 1, wherein the M stored values are the M most recently stored successive values.

9. The method of claim 1, wherein the value stored in each buffer cell equals the number of erroneously written data segments for the data set.

10. The method of claim 1, wherein the value stored in each buffer cell equals the total number of data segments written for the data set.

11. The method of claim 1, wherein a new output signal is generated every time a value is stored in a buffer cell.

12. The method of claim 1, wherein the output signal is generated at the end of a recording operation.

13. The method of claim 1, further comprising:
determining the number $PR_{1B}$ of the L buffer cells which contain stored values in excess of a fifth predetermined threshold value $TH_{PR-1B}$;
determining the number $PR_{2B}$ of the M buffer cells which contain stored values in excess of a sixth predetermined threshold value $TH_{PR-2B}$; and
generating an output signal indicating at least one of: whether the number $PR_{1A}$ exceeds a seventh predetermined threshold value $TH_{PR-1A}$ and whether the number $PR_{2A}$ exceeds an eighth predetermined threshold value $TH_{PR-2A}$.

14. Controller logic for a data recording device, the data recording device for recording data sets to a recording medium, each data set comprising a plurality of data segments, wherein during a data recording operation, erroneous data segments of a data set recorded on the recording medium are identified, the controller logic comprising:
a buffer comprising a set of L cells, including a sub-set of M cells, where M<L, each storage cell for containing a value representing the number of erroneous data segments of a data set;

a first network, comprising means for determining a number $PR_{1A}$ representing the number of the L cells having a value which exceeds a first predetermined threshold $TH_{HB-1A}$;
a second network, comprising
    means for determining a number $PR_{2A}$ representing the number of the M cells having a value which exceeds a second predetermined threshold $TH_{HB-2A}$; and
a combinatorial logic unit coupled to outputs of the first and second networks and having an output signal indicating at least one of: whether the number $PR_{1A}$ exceeds a third predetermined threshold value $TH_{PR-1A}$ and whether the number $PR_{2A}$ exceeds a fourth predetermined threshold value $TH_{PR-2A}$.

15. The controller logic of claim 14, wherein:
the first network further comprises means for generating an output $P_A$ having a state of 1 if $PR_{1A}$ exceeds the third predetermined threshold $TH_{PR-1A}$ and otherwise having a state of 0;
the second network further comprises means for generating an output $Q_A$ having a state of 1 if $PR_{2A}$ exceeds the fourth predetermined threshold $TH_{PR-2A}$ and otherwise having a state of 0; and
the combinatorial logic unit further comprises:
    first and second inputs coupled to receive the outputs $P_A$ and $Q_A$ from the first and second networks; and
    an output having:
        a first state if $P_A$ and $Q_A$ equal 0, the first state indicative of a non-error condition;
        a second state if $P_A$ equals 0 and $Q_A$ equals 1, the second state indicative of a late-occurring event;
        a third state if $P_A$ equals 1 and $Q_A$ equals 0, the third state indicative of a transient event; and
        a fourth state if $P_A$ and $Q_A$ equal 1, the fourth state indicative of a systematic condition.

16. The controller logic of claim 15, wherein:
in the first network:
    the means for determining the number $PR_{1A}$ comprises:
        a first comparator for comparing each value in the L buffer cells with the first predetermined threshold $TH_{HB-1A}$; and
        a first counter for counting the number of values in the L buffer cells having a value in excess of $TH_{HB-1A}$, the first counter having an output for outputting the number $PR_{1A}$; and
    the means for generating an output $P_A$ comprises a second comparator for comparing the output of the first counter $PR_{1A}$ to the third predetermined threshold $TH_{PR-1A}$; and
in the second network:
    the means for determining the number $PR_{2A}$ comprises:
        a third comparator for comparing each value in the M buffer cells with the second predetermined threshold $TH_{HB-2A}$; and
        a second counter for counting the number of values in the M buffer cells having a value in excess of $TH_{HB-2A}$, the second counter having an output for outputting the number $PR_{2A}$; and
    the means for generating an output $Q_A$ comprises a fourth comparator for comparing the output of the second counter $PR_{2A}$ to the fourth predetermined threshold $TH_{PR-2A}$.

17. The controller logic of claim 15, further comprising:
a third network, comprising:
    means for determining a number $PR_{1B}$ representing the number of the L cells having a value which exceeds a fifth predetermined threshold $TH_{HB-1B}$; and
    means for generating an output $P_B$ having a state of 1 if $PR_{1B}$ exceeds a sixth predetermined threshold $TH_{PR-1B}$ and otherwise having a state of 0;
a fourth network, comprising:
    means for determining a number $PR_{2B}$ representing the number of the M cells having a value which exceeds a seventh predetermined threshold $TH_{HB-2B}$; and
    means for generating an output $Q_B$ having a state of 1 if $PR_{2B}$ exceeds an eighth predetermined threshold $TH_{PR-2B}$, otherwise having a state of 0; and
the combinatorial logic unit further comprises third and fourth inputs for receiving the outputs $P_B$ and $Q_B$ from the third and fourth networks, the output further having fifth through twentieth states, each state indicative of a characteristic of the data recording device, wherein the fifth, ninth, thirteenth and seventeenth states correspond to the first, second, third and fourth states, respectively.

18. The controller logic of claim 17, wherein the output of the combinatorial logic unit is in the fifth through twentieth states according to a state table:

| State Table | | | | |
|---|---|---|---|---|
| $P_A$ | $Q_A$ | $P_B$ | $Q_B$ | State |
| 0 | 0 | 0 | 0 | 5 |
| 0 | 0 | 0 | 1 | 6 |
| 0 | 0 | 1 | 0 | 7 |
| 0 | 0 | 1 | 1 | 8 |
| 0 | 1 | 0 | 0 | 9 |
| 0 | 1 | 0 | 1 | 10 |
| 0 | 1 | 1 | 0 | 11 |
| 0 | 1 | 1 | 1 | 12 |
| 1 | 0 | 0 | 0 | 13 |
| 1 | 0 | 0 | 1 | 14 |
| 1 | 0 | 1 | 0 | 15 |
| 1 | 0 | 1 | 1 | 16 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

19. The controller logic of claim 17, wherein:
$TH_{HB-1A} < TH_{HB-1B}$ and $TH_{PR-1A} \leq TH_{PR-1B}$, whereby, when $P_B=1$, $P_A=1$;
$TH_{HB-2A} < TH_{HB-2B}$ and $TH_{PR-2A} \leq TH_{PR-2B}$, whereby, when $Q_B=1$, $Q_A=1$; and
the combinatorial logic unit generates the output signal according to a reduced state table:

| Reduced State Table | | | | |
|---|---|---|---|---|
| $P_A$ | $Q_A$ | $P_B$ | $Q_B$ | State |
| 0 | 0 | 0 | 0 | 5 |
| 0 | 1 | 0 | 0 | 9 |
| 0 | 1 | 0 | 1 | 10 |
| 1 | 0 | 0 | 0 | 13 |
| 1 | 0 | 1 | 0 | 15 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

20. The controller logic of claim 14, wherein the second network further comprises means for reading the M values.

21. The controller logic of claim 14, wherein the second network further comprises means for reading the M most recently stored successive values.

22. The controller logic of claim 14, wherein the value stored in each buffer cell equals the number of erroneously written data segments for the data set.

23. The controller logic of claim 14, wherein the value stored in each buffer cell equals the total number of data segments written for the data set.

24. The controller logic of claim 14, wherein a new output signal is generated every time a value is stored in a buffer cell.

25. The controller logic of claim 14, wherein the data recording device is a multi-wrap tape device and the output signal is generated when the data storage write operation reaches the end of a tape wrap.

26. The controller logic of claim 14, wherein the data recording device is an optical disc recording device.

27. The controller logic of claim 14, wherein the output signal is generated at the end of a recording operation.

28. The controller logic of claim 14, further comprising:
a third network comprising means for determining a number $PR_{1B}$ of the L buffer cells which contain stored values in excess of a fifth predetermined threshold value $TH_{PR-1B}$; and
a fourth network comprising means for determining a number $PR_{2B}$ of the M buffer cells which contain stored values in excess of a sixth predetermined threshold value $TH_{PR-2B}$;
wherein the combinatorial logic unit is further coupled to outputs of the third and fourth networks and the output signal indicates at least one of: whether the number $PR_{1A}$ exceeds a seventh predetermined threshold value $TH_{PR-1A}$ and whether the number $PR_{2A}$ exceeds an eighth predetermined threshold value $TH_{PR-2A}$.

29. A data recording device, comprising:
a transducer head for recording data to and reading data from a recordable medium;
a transport mechanism the recordable medium past the transducer head;
a data write channel for transmitting signals to the transducer head whereby data, comprising data sets, are recorded on the recordable medium during a recording operation, each data set comprising a plurality of data segments;
a data read channel for receiving signals from the transducer head whereby recorded data sets are read from the recordable medium; and
a write error detection unit coupled to the data write channel and the data read channel for detecting errors in recorded data segments;
a control unit coupled to the data write channel;
a buffer comprising a set of L cells, including a sub-set of M cells, where M<L, each storage cell for containing a value representing the number of erroneously written data segments of a data set which were written during a recording operation;
a first network, comprising means for determining a number $PR_{1A}$ representing the number of the L cells having a value which exceeds a first predetermined threshold $TH_{HB-1A}$;
a second network, comprising means for determining a number $PR_{2A}$ representing the number of the M cells having a value which exceeds a third predetermined threshold $TH_{HB-2A}$; and
a combinatorial logic unit coupled to outputs of the first and second networks and having an output signal indicating at least one of: whether the number $PR_{1A}$ exceeds a third predetermined threshold value $TH_{PR-1A}$ and whether the number $PR_{2A}$ exceeds a fourth predetermined threshold value $TH_{PR-2A}$.

30. The data recording device of claim 29, wherein:
the first network further comprises means for generating an output $P_A$ having a state of 1 if $PR_{1A}$ exceeds the third predetermined threshold $TH_{PR-1A}$ and otherwise having a state of 0;
the second network further comprises means for generating an output $Q_A$ having a state of 1 if $PR_{2A}$ exceeds the fourth predetermined threshold $TH_{PR-2A}$ and otherwise having a state of 0; and
the combinatorial logic unit further comprises:
first and second inputs coupled to receive the outputs $P_A$ and $Q_A$ from the first and second networks; and
an output having:
a first state if $P_A$ and $Q_A$ equal 0, the first state indicative of a non-error condition;
a second state if $P_A$ equals 0 and $Q_A$ equals 1, the second state indicative of a late-occurring event;
a third state if $P_A$ equals 1 and $Q_A$ equals 0, the third state indicative of a transient event; and
a fourth state if $P_A$ and $Q_A$ equal 1, the fourth state indicative of a systematic condition.

31. The data recording device of claim 30, wherein:
in the first network:
the means for determining the number $PR_{1A}$ comprises:
a first comparator for comparing each value in the L buffer cells with the first predetermined threshold $TH_{HB-1A}$; and
a first counter for counting the number of values in the L buffer cells having a value in excess of $TH_{HB-1A}$, the first counter having an output for outputting the number $PR_{1A}$; and
the means for generating an output $P_A$ comprises a second comparator for comparing the output of the first counter $PR_{1A}$ to the second predetermined threshold $TH_{PR-1A}$; and
in the second network:
the means for determining the number $PR_{2A}$ comprises:
a third comparator for comparing each value in the M buffer cells with the third predetermined threshold $TH_{HB-2A}$; and
a second counter for counting the number of values in the M buffer cells having a value in excess of $TH_{HB-2A}$, the second counter having an output for outputting the number $PR_{2A}$; and
the means for generating an output $Q_A$ comprises a fourth comparator for comparing the output of the second counter $PR_{2A}$ to the fourth predetermined threshold $TH_{PR-2A}$.

32. The data recording device of claim 30, further comprising:
a third network, comprising:
means for determining a number $PR_{1B}$ representing the number of the L cells having a value which exceeds a fifth predetermined threshold $TH_{HB-1B}$; and
means for generating an output $P_B$ having a state of 1 if $PR_{1B}$ exceeds a sixth predetermined threshold $TH_{PR-1B}$ and otherwise having a state of 0;
a fourth network, comprising:
means for determining a number $PR_{2B}$ representing the number of the M cells having a value which exceeds a seventh predetermined threshold $TH_{HB-2B}$; and means for generating an output $Q_B$ having a state of 1 if $PR_{2B}$ exceeds an eighth predetermined threshold $TH_{PR-2B}$, otherwise having a state of 0; and the combinatorial logic unit further comprises third and fourth inputs for receiving the outputs $P_B$ and $Q_B$ from the third and fourth networks, the output further having fifth through twentieth states, each state indicative of a characteristic of the data recording device, wherein the fifth, ninth, thirteenth and seventeenth states correspond to the first, second, third and fourth states, respectively.

33. The data recording device of claim 32, wherein the output of the combinatorial logic unit is in the fifth through twentieth states according to a state table:

| State Table | | | | |
|---|---|---|---|---|
| $P_A$ | $Q_A$ | $P_B$ | $Q_B$ | State |
| 0 | 0 | 0 | 0 | 5 |
| 0 | 0 | 0 | 1 | 6 |
| 0 | 0 | 1 | 0 | 7 |
| 0 | 0 | 1 | 1 | 8 |
| 0 | 1 | 0 | 0 | 9 |
| 0 | 1 | 0 | 1 | 10 |
| 0 | 1 | 1 | 0 | 11 |
| 0 | 1 | 1 | 1 | 12 |
| 1 | 0 | 0 | 0 | 13 |
| 1 | 0 | 0 | 1 | 14 |
| 1 | 0 | 1 | 0 | 15 |
| 1 | 0 | 1 | 1 | 16 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

34. The data recording device of claim 32, wherein:
$TH_{HB-1A} < TH_{HB-1B}$ and $TH_{PR-1A} \leq TH_{PR-1B}$, whereby, when $P_B=1$, $P_A=1$;
$TH_{HB-2A} < TH_{HB-2B}$ and $TH_{PR-2A} \leq TH_{PR-2B}$, whereby, when $Q_B=1$, $Q_A=1$; and
the combinatorial logic unit generates the output signal according to a reduced state table:

| Reduced State Table | | | | |
|---|---|---|---|---|
| $P_A$ | $Q_A$ | $P_B$ | $Q_B$ | State |
| 0 | 0 | 0 | 0 | 5 |
| 0 | 1 | 0 | 0 | 9 |
| 0 | 1 | 0 | 1 | 10 |
| 1 | 0 | 0 | 0 | 13 |
| 1 | 0 | 1 | 0 | 15 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

35. The data recording device of claim 29, wherein the second network comprises means for reading the M values.

36. The data recording device of claim 29, wherein the second network comprises means for reading the M most recently stored successive values.

37. The data recording device of claim 29, wherein the value stored in each buffer cell equals the number of erroneously written data segments for the data set.

38. The data recording device of claim 29, wherein the value stored in each buffer cell equals the total number of data segments written for the data set.

39. The data recording device of claim 29, wherein a new output signal is generated every time a value is stored in a buffer cell.

40. The data recording device of claim 29, wherein the output signal is generated at the end of the data storage write operation.

41. The data recording device of claim 29, wherein the data recording device is a magnetic recording drive and the recording medium is a magnetic tape medium.

42. The data recording device of claim 41, wherein the recordable medium is a multi-wrap recordable medium and the output signal is generated when the data recording operation reaches the end of a wrap.

43. The data recording device of claim 29, wherein the data recording device in an optical recording device and the recording medium is a recordable optical disc.

44. The data recording device of claim 29, further comprising:
a third network comprising means for determining a number $PR_{1B}$ of the L buffer cells which contain stored values in excess of a fifth predetermined threshold value $TH_{PR-1B}$; and
a fourth network comprising means for determining a number $PR_{2B}$ of the M buffer cells which contain stored values in excess of a sixth predetermined threshold value $TH_{PR-2B}$;
wherein the combinatorial logic unit is further coupled to outputs of the third and fourth networks and the output signal indicates at least one of: whether the number $PR_{1A}$ exceeds a seventh predetermined threshold value $TH_{PR-1A}$ and whether the number $PR_{2A}$ exceeds an eighth predetermined threshold value $TH_{PR-2A}$.

45. A computer program product on a computer-readable medium usable with a programmable computer, the computer program product having computer-readable code embodied therein for identifying systematic errors during a write operation in a data recording device, the computer-readable code comprising instructions for:
writing a plurality of data sets to a recording medium, each data set comprising a plurality of data segments;
identifying erroneously written data segments of each data set;
for each data set, storing in a buffer cell a value representative of the number of erroneously written data segments for the data set;
determining the number $PR_{1A}$ of a first plurality of L buffer cells which contain stored values in excess of a first predetermined threshold value $TH_{HB-1A}$;
determining the number $PR_{2A}$ of a second plurality of M buffer cells which contain stored values in excess of a second predetermined threshold value $TH_{HB-2A}$, where M<L; and
generating an output signal indicating at least one of: whether the number $PR_{1A}$ exceeds a third predetermined threshold value $TH_{PR-1A}$ and whether the number $PR_{2A}$ exceeds a fourth predetermined threshold value $TH_{PR-2A}$.

46. The computer program product of claim 45, wherein the computer-readable code further comprises instructions for:
reading back each data set;
re-writing the erroneously written data segments of the data set to the recording medium;
repeating the writing, reading, re-writing and storing steps until the plurality of L data sets have been written to the recording medium and a like plurality of values have been stored in successive buffer cells, including the plurality of M successively stored values;
wherein the output signal further indicates
a first state if $PR_{1A}$ is less than a third threshold value $TH_{PR-1A}$ and $PR_{2A}$ is less than a fourth predetermined threshold value $TH_{PR-2A}$, the first state indicative of a non-error condition;
a second state if $PR_{1A}$ is less than the third threshold value $TH_{PR-1A}$ and $PR_{2A}$ is greater than the fourth predetermined threshold value $TH_{PR-2A}$, the second state indicative of a late-occurring event;
a third state if $PR_{1A}$ is greater than the third threshold value $TH_{PR-1A}$ and $PR_{2A}$ is less than the fourth predetermined threshold value $TH_{PR-2A}$, the third state indicative of a transient event; and
a fourth state if $PR_{1A}$ is greater than the third threshold value $TH_{PR-1A}$ and $PR_{2A}$ is greater than the fourth predetermined threshold value $TH_{PR-2A}$, the fourth state indicative of a systematic condition.

47. The computer program product of claim 45, wherein the computer-readable code further comprises instructions for:
setting a variable $P_A$ equal to 1 if $PR_{1A}$ exceeds $TH_{PR-1A}$ and otherwise setting $P_A$ equal to 0; and
setting a variable $Q_A$ equal to 1 if $PR_{2A}$ exceeds $TH_{PR-2A}$ and otherwise setting $Q_A$ equal to 0;
whereby:
the output signal is in the first state if both $P_A$ and $Q_A$ equal 0;
the output signal is in the second state if $P_A$ equals 0 and $Q_A$ equals 1;
the output signal is in the third state if $P_A$ equals 1 and $Q_A$ equals 0; and
the output signal is in the fourth state if both $P_A$ and $Q_A$ equal 1.

48. The computer program product of claim 47, wherein the computer-readable code further comprises instructions for:
determining the number $PR_{1B}$ of the L buffer cells which contain stored values in excess of a fifth predetermined threshold value $TH_{HB-1B}$;
determining the number $PR_{2B}$ of the M buffer cells which contain stored values in excess of a sixth predetermined threshold value $TH_{HB-2B}$;
generating the output signal having fifth through twentieth states, each state indicative of a characteristic of the data recording device, the fifth, ninth, thirteenth and seventeenth states corresponding to the first, second, third and fourth states, respectively.

49. The computer program product of claim 48, wherein the computer-readable code further comprises instructions for:
setting a variable $P_B$ equal to 1 if $PR_{1B}$ exceeds $TH_{PR-1B}$ and otherwise setting $P_B$ equal to 0; and
setting a variable $Q_B$ equal to 1 if $PR_{2B}$ exceeds $TH_{PR-2B}$ and otherwise setting $Q_B$ equal to 0.

50. The computer program product of claim 49, wherein the output signal is in the fifth through twentieth states according to a state table:

| State Table | | | | |
|---|---|---|---|---|
| $P_A$ | $Q_A$ | $P_B$ | $Q_B$ | State |
| 0 | 0 | 0 | 0 | 5 |
| 0 | 0 | 0 | 1 | 6 |
| 0 | 0 | 1 | 0 | 7 |
| 0 | 0 | 1 | 1 | 8 |
| 0 | 1 | 0 | 0 | 9 |
| 0 | 1 | 0 | 1 | 10 |
| 0 | 1 | 1 | 0 | 11 |
| 0 | 1 | 1 | 1 | 12 |
| 1 | 0 | 0 | 0 | 13 |
| 1 | 0 | 0 | 1 | 14 |
| 1 | 0 | 1 | 0 | 15 |
| 1 | 0 | 1 | 1 | 16 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

51. The computer program product of claim 49, wherein the computer-readable code further comprises instructions for:
setting $TH_{HB-1A} < TH_{HB-1B}$ and setting $TH_{PR-1A} \leq TH_{PR-1B}$, whereby, when $P_B=1$, $P_A=1$;
setting $TH_{HB-2A} < TH_{HB-2B}$ and setting $TH_{PR-2A} \leq TH_{PR-2B}$, whereby, when $Q_B=1$, $Q_A=1$; and
generating the output signal according to a reduced state table:

| Reduced State Table | | | | |
|---|---|---|---|---|
| $P_A$ | $Q_A$ | $P_B$ | $Q_B$ | State |
| 0 | 0 | 0 | 0 | 5 |
| 0 | 1 | 0 | 0 | 9 |
| 0 | 1 | 0 | 1 | 10 |
| 1 | 0 | 0 | 0 | 13 |
| 1 | 0 | 1 | 0 | 15 |
| 1 | 1 | 0 | 0 | 17 |
| 1 | 1 | 0 | 1 | 18 |
| 1 | 1 | 1 | 0 | 19 |
| 1 | 1 | 1 | 1 | 20 |

52. The computer program product of claim 45, wherein the value stored in each buffer cell equals the number of erroneously written data segments for the data set.

53. The computer program product of claim 45, wherein the value stored in each buffer cell equals the total number of data segments written for the data set.

54. The computer program product of claim 45, wherein a new output signal is generated every time a value is stored in a buffer cell.

55. The computer program product of claim 45, wherein the M stored values are the M most recently stored successive values.

56. The computer program product of claim 45, wherein the output signal is generated the end of a write operation.

57. The computer program product of claim 45, wherein the computer-readable code further comprises instructions for:

determining the number $PR_{1B}$ of the L buffer cells which contain stored values in excess of a fifth predetermined threshold value $TH_{PR-1B}$;

determining the number $PR_{2B}$ of the M buffer cells which contain stored values in excess of a sixth predetermined threshold value $TH_{PR-2B}$; and generating an output signal indicating at least one of: whether the number $PR_{1A}$ exceeds a seventh predetermined threshold value $TH_{PR-1A}$ and whether the number $PR_{2A}$ exceeds an eighth predetermined threshold value $TH_{PR-2A}$.

* * * * *